United States Patent [19]

Muskovac

[11] 4,384,243
[45] May 17, 1983

[54] ENERGY SAVING MOTOR CONTROLLER

[75] Inventor: Nicholas G. Muskovac, Palm Harbor, Fla.

[73] Assignee: Vectrol, Inc., Oldsmar, Fla.

[21] Appl. No.: 161,327

[22] Filed: Jun. 20, 1980

[51] Int. Cl.³ .............................................. H02P 5/40
[52] U.S. Cl. .................................. 318/729; 318/798; 318/809
[58] Field of Search ............... 318/729, 798, 809, 810, 318/806, 822, 782, 434; 363/54, 57; 361/31, 30

[56] References Cited

U.S. PATENT DOCUMENTS

| | | | |
|---|---|---|---|
| 3,504,204 | 3/1970 | Carrive | 307/305 |
| 3,526,818 | 9/1970 | Graf | 318/434 |
| 3,577,177 | 5/1971 | Hewlett, Jr. | 323/18 |
| 3,584,282 | 6/1971 | Reeves et al. | 318/434 |
| 3,879,652 | 4/1975 | Billings | 307/232 UA |
| 3,959,704 | 5/1976 | McCrea | 361/31 |
| 4,007,401 | 2/1977 | Kimmel et al. | 361/31 |
| 4,038,695 | 7/1977 | DePuy | 361/96 |
| 4,052,648 | 10/1977 | Nola | 318/810 |
| 4,057,842 | 11/1977 | Bauman et al. | 361/31 |
| 4,174,496 | 11/1979 | McFall et al. | 361/97 |

OTHER PUBLICATIONS

IBM Tech. Bull., vol. 11, No. 5, Oct. 1968, p. 501.
IBM Tech. Disclosure Bull., vol. 15, No. 3, Aug. 1972, p. 734.
Nola F., "Circuit Saves Power In AC Induction Motors", EDN Magazine, Sep. 5, 1979, pp. 185-187.
"Power Factor Controller" Technical Support Package, NASA Brief No. MFS-23280, pp. 3-79.

Primary Examiner—David Smith, Jr.
Attorney, Agent, or Firm—Fleit, Jacobson & Cohn

[57] ABSTRACT

A multi-phase motor controller for controlling voltage and power expended by a multi-phase motor comprises a sensing stage for detecting power factor angle, a feedback amplifier stage for comparing the power factor angle with a desired power factor angle, and a control stage for controlling voltage and power expended by the multi-phase motor in accordance therewith. Other features of the motor controller include a current limiting circuit for limiting "in-rush" current during "start up" of the motor controller, a current trip circuit for implementing "instantaneous trip" and "timed trip" capabilities upon detection of corresponding "overload" conditions, and a phase-loss circuit for automatically disabling operation of the motor upon detection of "phase-loss". A further embodiment of the motor controller includes a lead network, connecting the feedback amplifier stage to the control stage, for enhancing the stability of operation of the motor controller.

14 Claims, 11 Drawing Figures

ENERGY SAVING MOTOR CONTROLLER

FIELD OF THE INVENTION

The present invention relates to an energy saving motor controller, and more particularly to a multi-phase motor controller for controlling the voltage and power expended by a motor connected to a load, the voltage and power expended by the motor being controlled based on the size of the load.

BACKGROUND OF THE INVENTION

In recent years, control circuitry for use with induction motors have been developed, the control circuitry functioning to improve the power factor of the motor, and thus reduce the power dissipation of such induction motors when partially loaded. Typically, induction motors, when operating below full load, exhibit power factors as low as 0.1 or 0.2. As a result, relatively large currents flow, while very little work is performed. Thus, power losses occur at all points (including the motor windings) in such a distribution system, even though no mechanical power is delivered.

Based on the latter realization, recent efforts have been directed to the development of an electronic control system which raises the power factor of the system so as to provide significant energy savings as a result. Such a control system is disclosed, for example, in U.S. Pat. No. 4,052,648 to Nola, and in a corresponding article entitled "Circuit Saves Power In AC Induction Motors", by Frank J. Nola, National Aeronautics and Space Administration, Published in EDN Magazine (Sept. 5, 1979), pages 185–189, as well as in NASA Tech Brief No. NTN-78/0252 (MFS-23389), entitled "Save Power In AC Induction Motors".

More specifically, the latter discloses a power controller which reduces power losses by sensing the phase lag between voltage and current. It provides this information to circuitry which forces a motor to run at a constant, predetermined optimum power factor, regardless of load or line-voltage variations (within the motors limits). More specifically, when the load is reduced, a solid-state switch (triac) in the controller reduces the applied voltage, minimizing wasted power. As the load increases, it, in turn, increases the voltage to the proper operating level.

A significant disadvantage of such a controller resides in the fact that, whereas single-phase motors require no modification to use the controller, use of the controller with multi-phase motors (for example, the wye-connected three-phase motor) requires opening the motor and making internal connections within the motor (for example, connecting to the wye internal to the motor or to the neutral of the three-phase line), and then placing a triac with its firing circuitry in series with each phase of the motor. Another disadvantage of such prior art controllers resides in the fact that, when such controllers are first started, substantial power is wasted. That is to say, upon starting the controller, typically, maximum "in rush" current is applied, much of which current is wasted until the motor controller arrives at its normal, stabilized level of operation.

Motor controllers of the prior art have also been equipped with an "overload trip" capability, whereby, when the controller senses an overloading of the motor, operation of the motor is immediately interrupted or "tripped". However, this technique has been implemented in terms of a total and immediate trip, without regard to the amount of overload. It has been recognized that such constitutes an inefficient way of operating, since it is often not necessary to immediately interrupt the operation of the motor. For example, while a very high overloading of the motor renders it necessary to turn the motor off as quickly as possible, with slight overloading of the motor, it is possible to turn the motor off somewhat more slowly with no risk of damage. In other words, the technique of instantaneously turning off the motor upon detection of any overload, no matter how small, amounts to an inefficient and unnecessarily inconvenient method of operation.

Motor controllers having an overload trip capability typically face the problem of disabling that capability on "start up". That is, since the load applied to the motor at "start up" is typically large enough to exceed the overload threshold, inadvertent operation of the overload trip function will result in "start up" unless the function is disengaged. Thus, substantial operational improvement can be gained from providing a motor controller with the capability of automatically disabling the overload trip capability or feature for a certain period of time following "start up".

In the prior art, motors have been susceptible to damage if phase has been lost during their operation. That is to say, if phase is lost, a multi-phase motor will typically try to go to a single phase mode of operation, and will burn up. Thus, it is considered quite advantageous to have a motor controller which, upon detection of phase loss, immediately shuts the motor off.

Whereas the prior art has included implementation of a motor controller by means of silicon-controlled rectifiers (see, for example, the aforementioned patent and article of Frank F. Nola), unless such silicon-controlled rectifiers are controlled properly, so as to cut off quickly and act like fuses, the motor controllers must also include fuses. Thus, a foremost deficiency of prior art controllers resides in the fact that, even though such silicon-controlled rectifiers have been utilized, they have not been properly controlled (that is, properly pulsed) so as to act like fuses. If such were the case, significant savings in cost of the controller would be achieved.

Finally, motor controllers of the prior art have not been capable of functioning uniformly, that is to say, functioning as well in the presence of distorted AC line voltages as they function in the absence thereof.

SUMMARY OF INVENTION

According to the present invention, there is provided a multi-phase motor controller for controlling voltage and power expended, such control being achieved in accordance with the load applied to the motor.

To be more specific, the multi-phase motor controller comprises: a sensing stage connected to a multi-phase AC line for detecting the power factor angle of the AC line voltage, that is, the phase angle difference between the voltage and current of a motor connected to the AC line; a feedback amplifier stage for comparing the sensed phase angle difference between motor voltage and motor current with a fixed reference, that is, with a desired phase angle difference, so as to generate a feedback control signal; and a control stage responsive to the feedback control signal for controlling the voltage and power expended by the multi-phase motor based on the load applied thereto.

In a preferred embodiment, the motor controller is provided with a current limiting circuit which, during "start up" of the motor controller, limits the "in rush" current, so as to provide efficient operation in the form of energy conservation during "start up". The current limiting circuit preferably has the capability of being set by the operator to designate a selected value to which the motor current is to be limited during "start up".

A further embodiment of the motor controller of the present invention includes a current trip circuit which, in response to detection of the motor current, compares the motor current with a threshold value so as to generate an overload trip signal, causing interruption of AC voltage applied to the motor. More specifically, the current trip circuit generates an instantaneous overload trip signal when a predetermined threshold of motor current is exceeded, so as to instantaneously interrupt application of AC voltage to the motor (within one-half line cycle). The current trip circuit is also provided with the capabilities of sensing a motor current overload condition below the predetermined threshold but above a value set by the operator and of responding thereto by generating a timed overload trip signal, causing the interruption of AC voltage applied to the motor over some time period of variable duration. The latter variable duration for interruption has, in accordance with the invention, an inverse relationship to the amount of overload detected, such that larger overloads are interrupted more quickly, while smaller overloads are interrupted less quickly. Moreover, in accordance with a further feature of the present invention, a start time circuit is provided for the purpose of disabling the current trip circuit, and thus the timed overload trip capability, during "start up" of the motor.

A preferred embodiment of the motor controller of the present invention includes a sensing stage which comprises a voltage sensing circuit connected to the AC voltage line, which voltage sensing circuit, in conjunction with a voltage reference circuit, measures the motor voltage phase angle. Moreover, the sensing stage further comprises a current sensing circuit for measuring the motor current phase angle. As a result, the sensing stage is able to obtain the phase angle difference between the motor voltage phase angle and motor current phase angle, and to provide a power factor feedback signal.

The motor controller also includes a feedback amplifier stage responsive to the power factor feedback signal from the sensing stage for activating the control stage to perform the functions generally described above, and described in more detail below.

In a preferred embodiment, the motor controller includes a control stage comprising trigger circuitry driven by the feedback amplifier stage for producing properly timed gate pulses, that is, gate pulses timed in accordance with the particular multi-phase power system. These gate pulses are employed to drive switching circuitry also contained in the control stage. More particularly, the switching circuitry preferrably includes a pair of silicon-controlled rectifiers for each phase of the multi-phase power system, each of the silicon-controlled rectifiers being driven by a corresponding train of gate pulses from the trigger circuitry.

Finally, in a further preferred embodiment of the present invention, a lead network is provided between the sensing stage and the feedback amplifier stage in order to provide enhancement of the stability of the closed-loop system which, in accordance with the present invention, controls the power factor of the motor.

Therefore, it is an object of the present invention to provide a multi-phase motor controller for controlling voltage power expended by a motor based on the load applied to the motor.

It is a further object of the present invention to provide a motor controller which reduces the "in rush" current applied to the motor during "start up" thereof.

It is a further object of the present invention to provide a motor controller with a current overload sensing capability, such that an instantaneous overload trip operation is carried out when the overload current exceeds a predetermined threshold, and such that a timed overload trip operation is carried out upon occurrence of an overload current which is greater than a predetermined value set by the operator.

It is a further object of the present invention to provide a motor controller having a timed overload trip capability, such that greater overloads result in quicker tripping of the motor, while lesser overloads result in slower tripping of the motor.

It is a further object of the present invention to provide a motor controller, wherein the timed overload trip capability is disabled during "start up" of the motor.

It is an additional object of the present invention to provide a motor controller having the capabilities of detecting phase loss and of shutting off the motor upon such detection.

It is an additional object of the present invention to provide a motor controller having a power trigger circuit which provides proper gate pulses to a switching circuit, such gate pulses being properly timed for the particular type of multi-phase power system employed.

It is an additional object of the present invention to provide a motor controller having a power trigger circuit which works well even with distorted AC line voltages.

It is an additional object of the present invention to provide a motor controller having a power trigger circuit which operates in conjunction with a switching circuit, the latter comprising silicon-controlled rectifiers, the power trigger circuit operating on the switching circuit so as to make the silicon-controlled rectifiers act like fuses, that is, force them to be cut off quickly.

Finally, it is an additional object of the present invention to provide a motor controller having a closed-loop system for controlling power factor, and having enhanced stability of operation of the closed-loop system.

The above and other objects that will hereinafter appear, and the nature of the invention, will more clearly be understood by reference to the following description, the appended claims, and the accompanying drawings.

DETAILED DESCRIPTION

The composition and operation of the motor controller of the present invention will now be described in more detail with reference to the various figures of the drawings.

Figure 1:
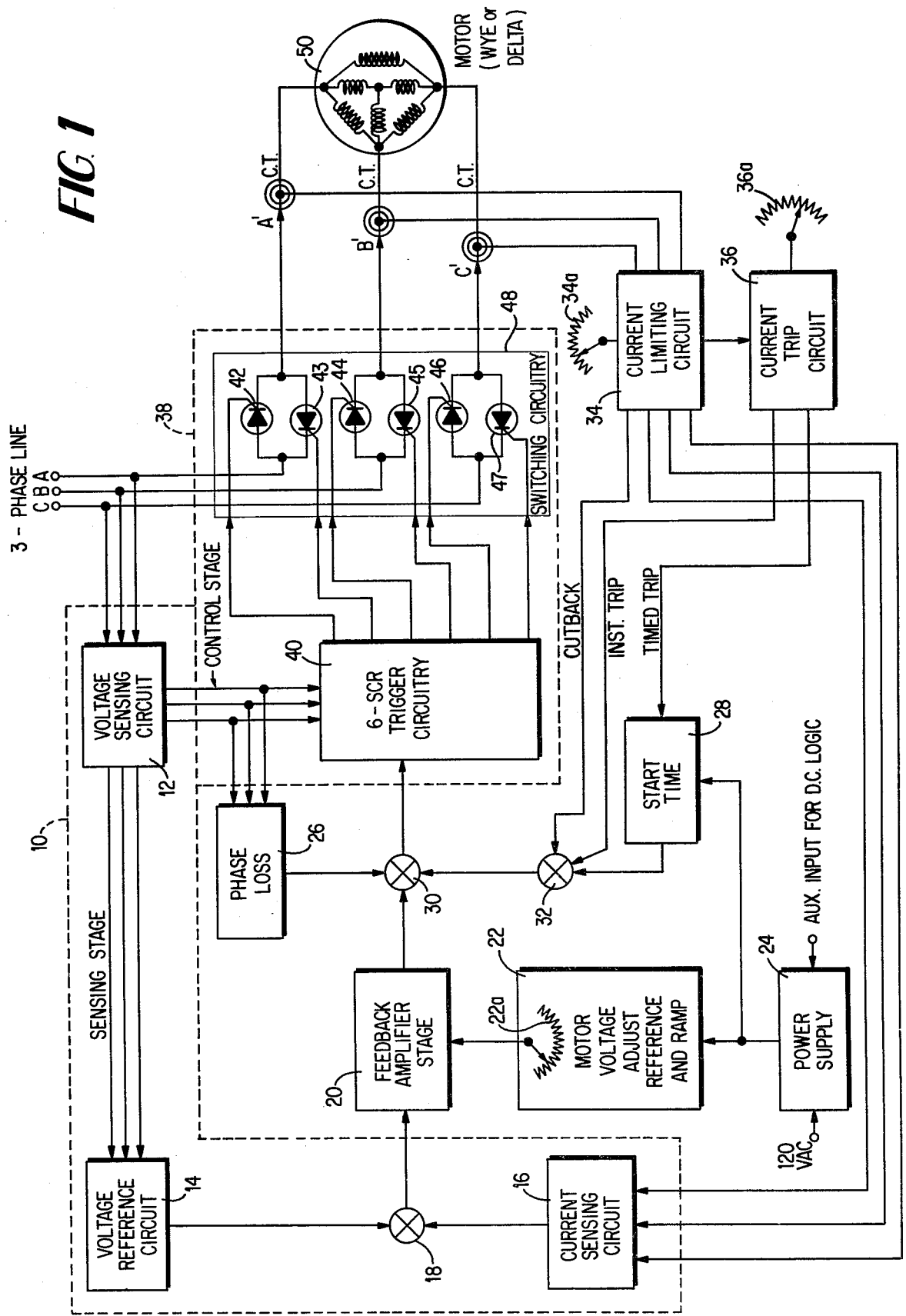
FIG. 1 is a block diagram of the motor controller of the present invention.

FIG. 1 is a block diagram of the motor controller of the present invention. As seen in FIG. 1, the motor controller of the present invention comprises the following components: a sensing stage 10 comprising a voltage sensing circuit 12, voltage reference circuit 14, current sensing circuit 16, and junction 18; a feedback amplifier stage 20; a motor voltage adjust reference and ramp circuit 22; a power supply 24; a phase loss circuit 26; a start time circuit 28; junctions 30 and 32; a current limiting circuit 34; a current trip circuit 36; and a control stage 38, comprising trigger circuitry 40 and silicon-controlled rectifiers (SCR's) 42-47 (making up switching circuitry 48).

In operation, sensing stage 10 is connected to a multi-phase AC line (in the embodiment shown, a three-phase line, having phases A, B and C) for detecting the power factor angle of the AC line voltage, that is, the phase angle difference between the voltage and current of a motor 50 connected to the AC line. More specifically, the voltage sensing circuit 12 is connected to the AC voltage line and, in conjunction with a voltage reference circuit 14, measures the motor voltage phase angle. Current sensing circuit 16 operates via a current limiting circuit 34 to measure the motor current phase angle of motor 50. As a result, sensing stage 10 is able to obtain the phase angle difference between the motor voltage phase angle and the motor current phase angle and to provide a corresponding power factor feedback signal at the output of junction 18.

Feedback amplifier stage 20 is connected to the output of junction 18 so as to receive, as a first input, the power factor feedback signal representing the sensed phase angle difference between motor voltage and motor current. Feedback amplifier stage 20 is also connected to motor voltage adjust reference and ramp circuit 22 which, in response to setting of potentiometer 22a by the operator, provides a fixed reference voltage as a second input to the feedback amplifier stage 20. Motor voltage adjust reference and ramp circuit 22 is supplied by power supply 24.

In response to the aforementioned two inputs, feedback amplifier stage 20 generates a feedback control signal and provides same, via junction 30, to control stage 38. In response thereto, control stage 38 controls the voltage and power expended by the multi-phase motor 50 based on the load applied thereto.

More specifically, control stage 38 includes trigger circuitry 40 which, in response to the multi-phase line voltage (as sensed and provided by voltage sensing circuit 12), and in response to the feedback control signal from junction 30, produces properly timed gate pulses, that is, gate pulses timed in accordance with the particular multi-phase power system. These gate pulses are employed to drive switching circuitry 48. That is to say, the gate pulses are provided to the control leads of the SCR's 42-47, the latter functioning to selectively provide the various phases of the AC line voltage to the motor 50 as phase inputs A', B', and C', respectively.

As previously stated, the motor controller of the present invention is provided with a current limiting circuit 34 which, during "start up" of the motor controller, limits the "in rush" current, so as to provide efficient operation in the form of energy conservation during "start up". Current limiting circuit 34 is capable of being set by the operator, via switch 34a, so that "in rush" current can be limited during "start up" to a predetermined percentage (for example, 200-300%) of normal operating current. Limitation of the "in rush" current to the motor 50 is accomplished by means of generation, by current limiting circuit 34, of signal CUTBACK, provided via junctions 32 and 30 to control stage 38.

The motor controller of the present invention also includes a current trip circuit 36 which, via an input from current limiting circuit 34, detects the presence of motor current. Current trip circuit 36 compares the detected motor current with a predetermined threshold (for example, 600% of normal operating current), and, if the threshold is exceeded, generates signal INST TRIP, provided via junctions 32 and 30 to trigger circuitry 40. This results in rapid interruption of the operation of the motor 50, thus preventing damage thereto. In addition, current trip circuit 36 is capable of detecting motor current which exceeds a threshold value set by the operator on switch 36a. For example, switch 36a can be set to provide "tripping" of the motor upon detection of an overload current equal to a given percentage of normal operating current (for example, 100-130% thereof). Upon detection of such an overload, current trip circuit 36 generates output TIMED TRIP, provided via start time circuit 28 and junctions 32 and 30 to the trigger circuit 40.

Figure 2:
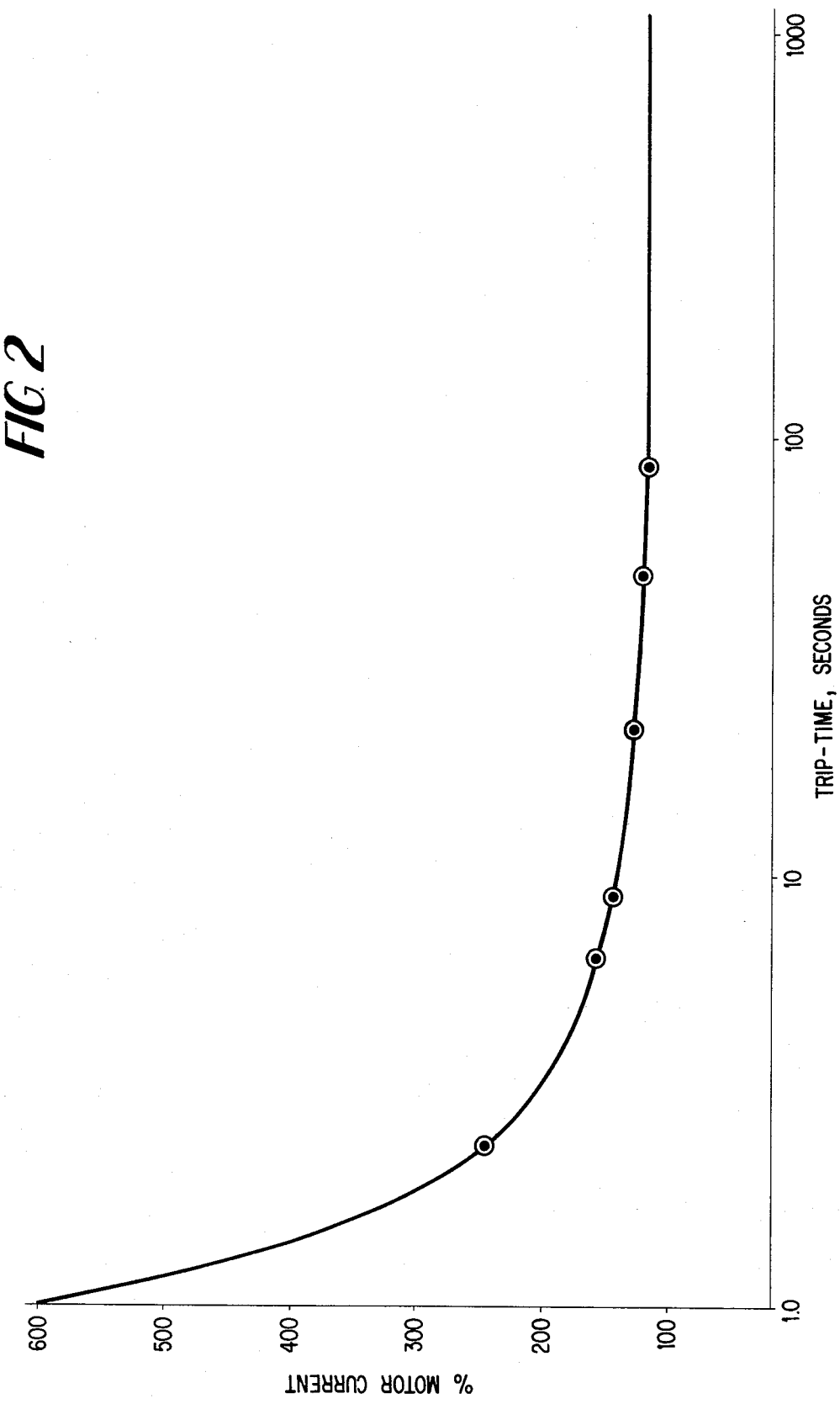
FIG. 2 is a graph illustrating the timed overload trip capability of the present invention.

With respect to the latter function of current trip circuit 36, reference is now made to FIG. 2 which is a graph illustrating the timed overload trip capability of current trip circuit 36. In accordance with this capability of the motor controller of the present invention, when a small overload is detected (for example, 150% of motor current), motor operation is interrupted rather slowly (for example, in approximately 9 seconds, as indicated in FIG. 2). Conversely, when a relatively large overload is detected (for example, 250% of motor current), a relatively rapid interruption of motor current results (occurring, for example, in approximately 3.5 seconds, as shown in FIG. 2). Thus, in accordance with this feature of the present invention, the motor is interrupted after passage of a predetermined time which has an inverse relationship to the magnitude of the overcurrent detected.

Referring again to FIG. 1, as indicated earlier, the output TIMED TRIP of current trip circuit 36 is provided to trigger circuitry 40 via start time circuit 28. Start time circuit 28 receives power from power supply 24. Moreover, start time circuit 28 detects the "start up" of the operation of the motor controller of the present invention, and, in response to such detection, disables the "timed trip" feature of the present invention during "start up" by blocking the provision of output TIMED TRIP to the trigger circuitry 40. This results in a further feature of the present invention, whereby, during "start up" of the motor operation (when motor current necessarily surges to values characterized as an overload), inadvertent operation of the "timed trip" feature is precluded by disabling of that capability.

The motor controller of the present invention also includes a phase loss circuit 26 connected to receive the AC voltage via voltage sensing circuit 12. In a manner to be described in more detail below, phase loss circuit 26 detects loss of phase in the AC line voltage, and provided a corresponding output via junction 30 to trigger circuitry 40. As a result, trigger circuitry 40 operates the SCR's 42–47 so as to interrupt the application of motor voltage and current to the motor 50.

Figure 3:
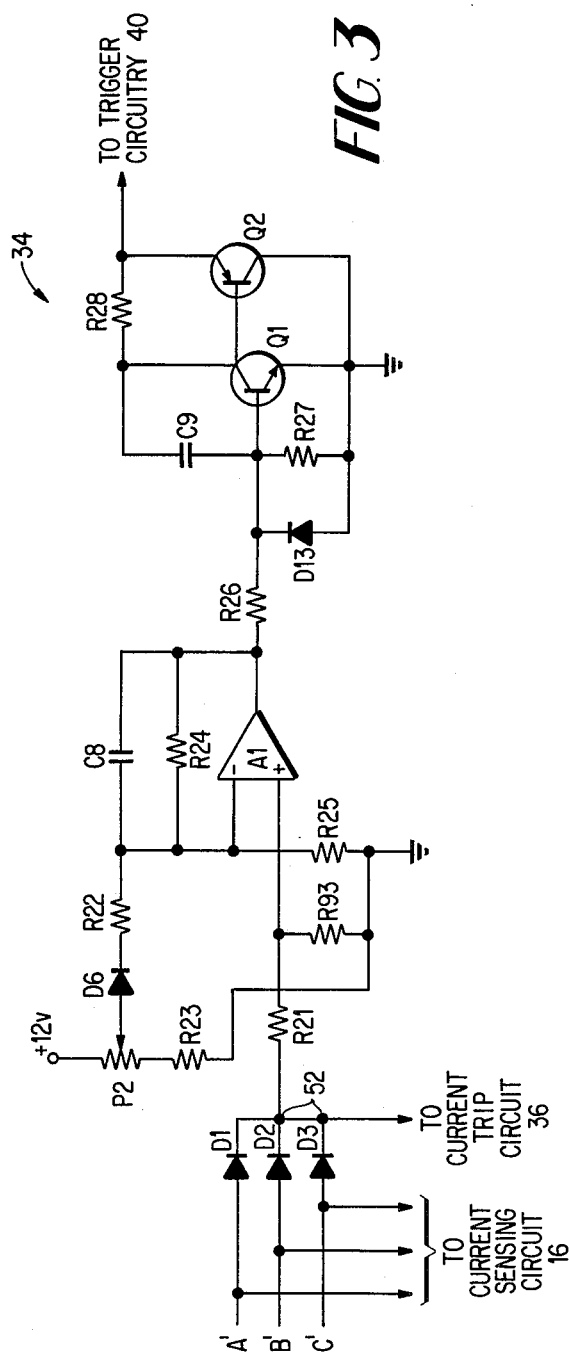
FIG. 3 is a schematic of the current limiting circuit of the motor controller of the present invention.

FIG. 3 is a schematic of the current limiting circuit 34 of the motor controller of the present invention. As seen therein, current limiting circuit 34 basically comprises potentiometer P2, differential amplifier A1, transistors Q1 and Q2, and other associated resistors, capacitors, and diodes.

In operation, current limiting circuit 34 receives current signals A', B' and C' from switching circuitry 48 (FIG. 1), and rectifies the current signals via diodes D1, D2 and D3. The rectified signals are combined at junction 52, and then provided, via voltage-divider resistors R21 and R93, to the positive input of differential amplifier A1. The combined, rectified signals are also provided to current trip circuit 36 for reasons to be discussed below.

Differential amplifier A1 also receives, at its negative input, a reference voltage obtained from potentiometer P2, via diode D6 and resistor R22. The setting of potentiometer P2 corresponds to the setting of current limiting potentiometer 34a (FIG. 1). When the combined, rectified signal applied to the positive input of differential amplifier A1 exceeds the reference applied to the negative input thereof, the output of amplifier A1 goes positive and, via resistor R26 connected to the base of transistor Q1, turns on transistor Q1. This, in turn, turns on transistor Q2. As a result, the output current provided by amplifier A1, via resistor R26, capacitor C9, and resistor R28, to the trigger circuitry 40 (FIG. 1) is shunted to ground. Referring to FIG. 1, this corresponds to generation, by current limiting circuit 34, of signal CUTBACK, the latter being provided via junctions 32 and 30 to the trigger circuitry 40, resulting in a reduction in the feedback output signal (of feedback amplifier stage 20) provided to trigger circuitry 40. As a result of this reduction in the feedback output signal applied to trigger circuitry 40, motor current is limited.

Figure 4:
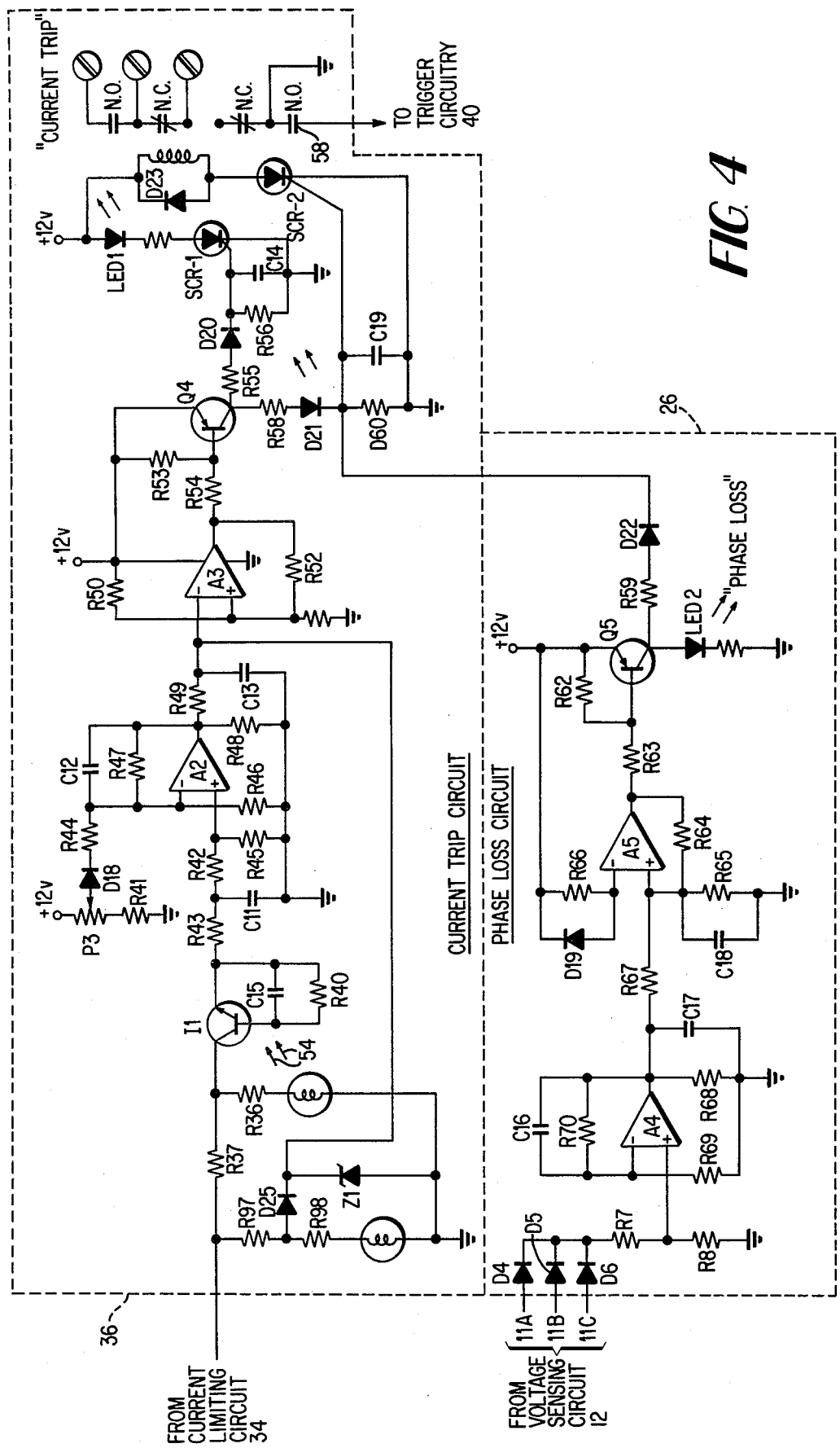
FIG. 4 is a schematic of the current trip circuit and phase loss circuit of the motor controller of the present invention.

FIG. 4 is a schematic of the current trip circuit 36 and phase loss circuit 26 of the motor controller of the present invention. As seen therein, the current trip circuit 36 basically comprises an opto-isolator I1, operational amplifiers A2 and A3, silicon-controlled rectifiers SCR-1 and SCR-2, and associated elements.

In operation, referring back to FIG. 3, signals A', B' and C' are rectified in diodes D1, D2 and D3, respectively, combined at junction 52, and provided to the current trip circuit 36 of FIG. 4. For the purpose of performing the "timed trip" function, this input signal is provided via resistor R37 to opto-isolator I1. The opto-isolator I1 responds to "start up" of the motor controller, as indicated by the received signals 54, to disable the "timed trip" function until after the "start up" period is completed. The signals 54 are, as will be seen below, generated in the start time circuit 28 of FIG. 1.

Presuming that opto-isolator I1 is not in the "disabling" mode of operation, the input signals are provided via a preliminary filter, comprising resistors R42 and R43, in conjunction with capacitor C11, to the positive input of amplifier A2. The negative input of amplifier A2 receives a reference voltage from potentiometer P3, via diode D18 and resistor R44. Setting of potentiometer P3 corresponds to operator setting of current trip switch 36a (FIG. 1), thus establishing the overcurrent threshold for the "timed trip" feature.

Amplifier A2 is configured, with feedback resistor R47 and capacitor C12, so as to perform an integrating function. Thus, amplifier A2 amplifies and integrates the input signal in accordance with a time constant determined by resistor R47 and capacitor C12. If the input signal from current limiting circuit 34 is large, the output of amplifier A2 rises quickly; conversely, if the input signal is small, the output of amplifier A2 rises slowly. Thus, amplifier A2 of current trip circuit 36 performs the "timed trip" function, whereby a large current overload (indicated by a large input signal) results in rapid interruption of motor operation (corresponding to a quickly rising output of amplifier A2), while a small current overload (indicated by a small input signal from current limiting circuit 34) results in a slower interruption of motor operation (as indicated by a slowly rising output of amplifier A2).

The output of amplifier A2 is provided, via a summing junction 56, to the negative input of amplifier A3. Amplifier A3 acts as a comparator, being provided with a reference voltage at its positive input. Whenever the voltage applied to amplifier A3 rises above the reference voltage, the output of amplifier A3 goes low, turning on transistor Q4 via base resistor R54. When transistor Q4 comes on, it fires rectifier SCR-1 (via resistor R55 and diode D20), as well as rectifier SCR-2 (via resistor R58 and diode D21). Conduction of rectifier SCR-1 turns on an indicator light LED1 so as to indicate "current trip", while conduction of rectifier SCR-2 closes normally open switch 58, so as to ground the output to trigger circuitry 40 (FIG 1), thus shorting the DC trigger voltage as applied to the switching circuitry 48. This results in interruption of the operation of the motor 50.

From the above, it is clear that operation of amplifier A2 (FIG. 4), with its integration function, results in disruption of the operation of motor 50 (FIG. 1) only after a given length of time (corresponding to the integration time constant) has passed, such time having an inverse relationship to the amount of overload current detected by the current trip circuit 36. Thus, the "timed trip" feature is provided.

In accordance with the "instant trip" feature, the input signal to current trip circuit 36 is also provided, via resistor R97 and diode D25, to the negative input of amplifier A3. As a result, the opto-isolator I1 and integrating amplifier A2 are bypassed. Thus, in accordance with the "instant trip" function of current trip circuit 36, occurrence of an excessive overload condition, as indicated by the negative input of amplifier A3 rising above the predetermined reference voltage provided at the positive input thereof, causes an immediate interruption of the operation of motor 50 (FIG. 1) by immediate disabling of the SCR's 42–47 in switching circuitry 48. In the embodiment shown, resistors R97 and R98, which perform a voltage-division function, provide the input signal, via diode D25 (connected to ground by zener diode Z1), to the negative input of amplifier A3. Moreover, in the embodiment shown, the "instant" interruption of operation of motor 50 (FIG. 1) is achieved in approximately 8 milliseconds. The aforementioned elements can, of course, be adjusted in value to achieve any other desired speed of interruption and any desired overload threshold.

Figure 5A:
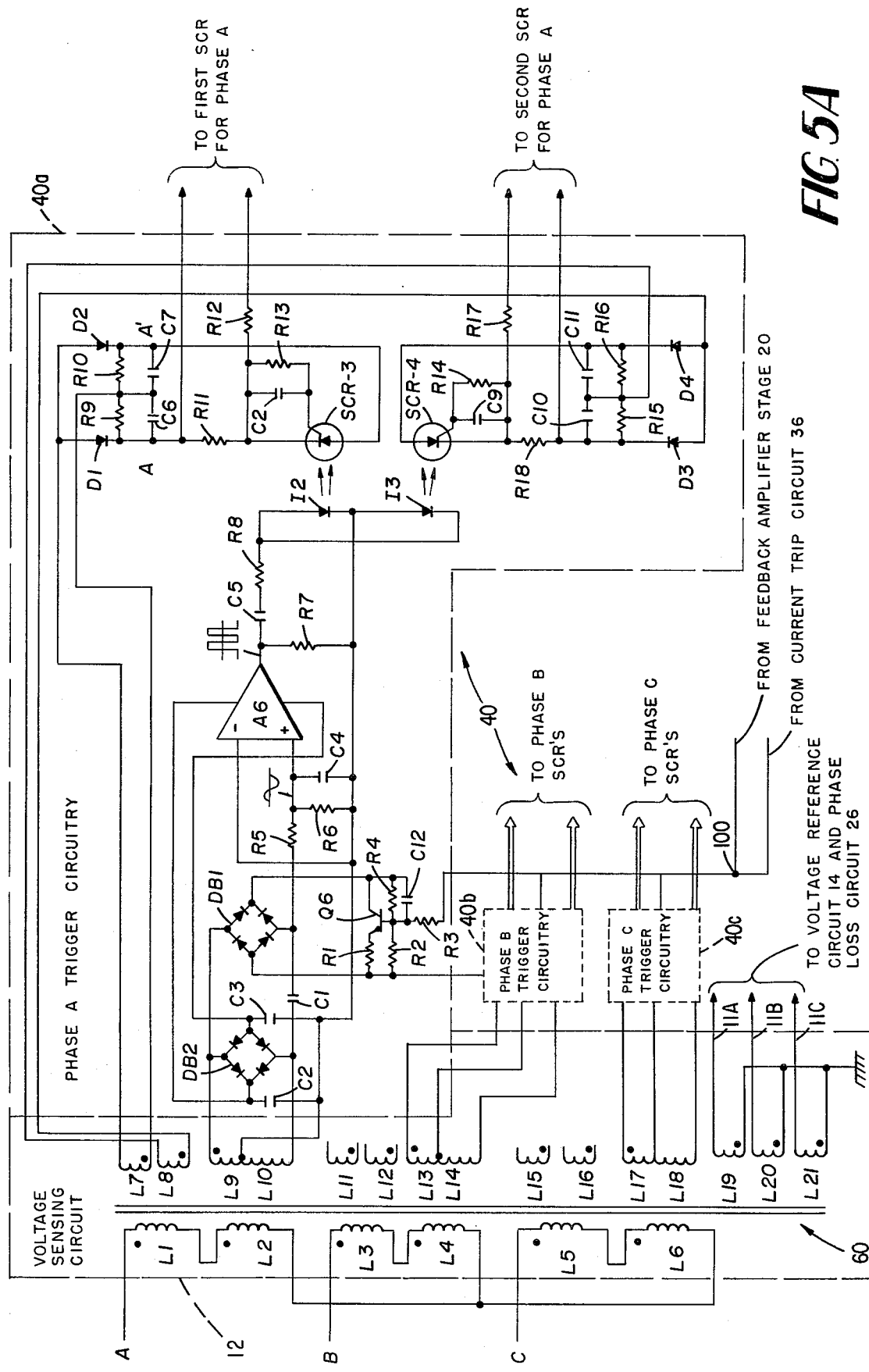
FIG. 5A is a schematic of the voltage sensing circuit and trigger circuitry of the motor controller of the present invention.

Further referring to FIG. 4, the phase loss circuit 26 is seen to basically comprise amplifiers A4 and A5, and transistor Q5. Referring to FIGS. 1 and 5A, voltage sensing circuit 12 receives the three phase voltages A, B and C via a transformer (generally shown by numeral 60 in FIG. 5A), and provides voltage outputs 11A–11C, among other voltages. Referring to FIG. 4, these voltages 11A–11C are rectified in diodes D4–D6, respectively, and are provided via voltage-dividing resistors R7 and R8 to the positive input of amplifier A4. Amplifier A4, in conjunction with associated resistors R68–R70 and capacitors C16–C17, performs a filter averaging function, so as to provide at its output a filtered average DC voltage. This output is provided, via resistor R67, to the positive input of comparator A5, the negative input of which receives a reference voltage via diode D19 and resistor R66 from a 12-volt power supply. In the preferred embodiment, the reference voltage provided to the negative input of amplifier A5 is set to a voltage level about 25% lower than the input voltage. Whenever phase is lost, therefore, the average DC voltage output of amplifier A4 drop approximately 33% below its normal voltage level, and the comparator A5 detects this and goes low. As a result, transistor Q5 turns on. When transistor Q5 turns on, a "phase loss" display indicator LED2 is activated. In addition, rectifier SCR-2 (in the current trip circuit 36 of FIG. 4) is also activated. As a result, the normally open switch or contacts 58 are closed, and the voltage applied to trigger circuitry 40 (FIG. 1) is shorted. Thus, trigger circuitry 40 causes disabling of rectifiers 42–47 in switching circuitry 48, and operation of the motor 50 is interrupted.

It is to be noted that rectifier SCR-2 and normally open contact 58 stay latched until the +12 volts DC voltage is removed. This can be done by opening the 120 VAC input to a transformer (not shown) in the power supply 24. Other conventional techniques, as would be obvious to one of ordinary skill in the art, can also be employed to deactivate the "phase loss" condition.

FIG. 5A is a schematic of the voltage sensing circuit 12 and trigger circuitry 40 of the motor controller of the present invention. As seen therein, voltage sensing circuit 12 comprises a plurality of transformers (generally shown by numeral 60) for receiving and transforming the three-phase AC voltage. Specifically, primary windings L1 and L2 receive phase A, windings L3 and L4 receive phase B, and windings L5 and L6 receive phase C. The phase A voltage is transformed so as to appear on secondary windings L7–L10. Similarly, phase B is transformed so as to appear on secondary windings L11–L14. Phase C is transformed so as to appear on secondary windings L15–L18. Finally, phases A, B and C are transformed so as to appear on secondary windings L19, L20 and L21, respectively, as signals 11A, 11B and 11C, respectively, the latter being provided (as previously described) to the phase loss circuit 26 of FIG. 4.

As also seen in FIG. 5A, trigger circuitry 40 comprises phase A trigger circuitry 40a, phase B trigger circuitry 40b, and phase C trigger circuitry 40c. Since the composition of each of these trigger circuits is identical, the operation of trigger circuitry 40 will now be described with reference to phase A trigger circuitry 40a.

Basically, phase A trigger circuitry 40a comprises diode bridges DB1 and DB2, op amp A6, opto-isolators I2 and I3, corresponding silicon-controlled rectifiers SCR-3 and SCR-4, and other associated elements. The operation of trigger circuitry 40a will now be described with reference to the waveform diagrams of FIGS. 5B and 5C.

Figure 5B:
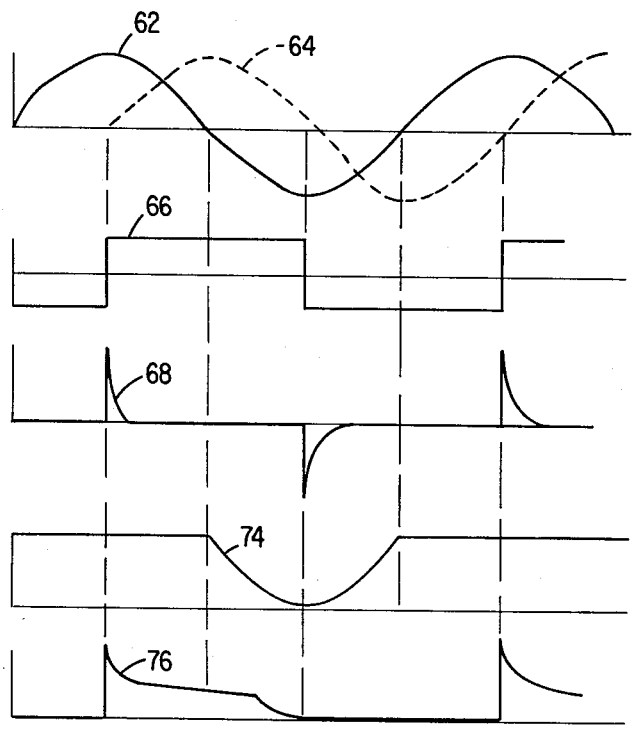
FIGS. 5B and 5C are waveform diagrams related to the operation of the trigger circuitry of FIG. 5A.

The transformed phase A voltage input is provided, via diode bridge DB2, to a phase-shifter circuit made up of diode bridge DB1, transistor Q6, resistors R1–R4, and capacitors C1 and C12. The aforementioned phase-shifter circuit receives the feedback control signal from feedback amplifier stage 20 (FIG. 1) summed with the output signal of current trip circuit 36 (FIG. 4). The summation takes place at summing junction 100 (FIG. 5A), corresponding to junctions 30 and 32 (FIG. 1), and the resulting summed signal comprises a feedback control signal which is applied, via resistor R3, to the base of transistor Q6. Since this feedback control signal represents the result of comparing the sensed phase angle difference between motor voltage and motor current with a fixed reference, the aforementioned phase-shifter produces an output phase-shifted by an amount proportional to the results of that comparison. That is, if an "in-phase" condition exists, the transistor Q6 is turned fully on, the bridge DB1 is shorted, and no phase shift occurs; if a "partial out-of-phase" condition exists, transistor Q6 is turned partially on, and bridge DB1 effects a partial phase shift; if a "fully out-of-phase" condition exists, transistor Q6 is turned off, and bridge DB1 effects a full 180° phase shift. Referring to FIG. 5B, waveform 62 represents the input to the phase-shifter, while waveform 64 represents the phase-shifted output thereof, which is applied (via resistor R5) to the positive input of op amp A6 of FIG. 5A.

Op amp A6 performs a squaring operation so as to produce, at its output, a squared waveform 66 (FIG. 5B), representing a squared version of the phase-shifted output of diode bridge DB1. The resulting alternating square waveform 66 is passed through capacitor C5 to develop waveform 68, which is used to drive opto-isolators I2 and I3. These opto-isolators I2 and I3, in turn, optically drive silicon-controlled rectifiers SCR-3 and SCR-4, respectively.

Figure 5C:
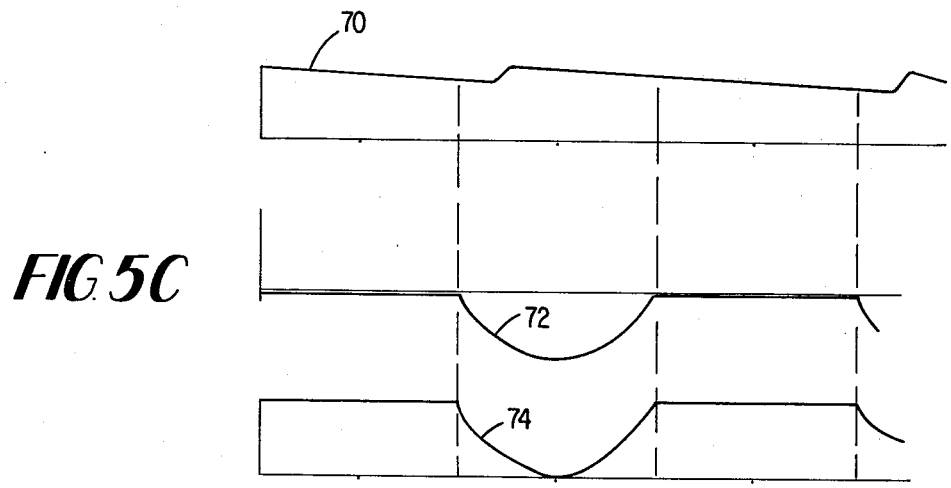

A portion of the transformed phase A voltage, appearing across secondary winding L7, is applied, via diodes D1 and D2, across resistors R9 and R10, and capacitors C6 and C7. Waveform 70 of FIG. 5C represents the voltage appearing across diode D2 and capacitor C7. Furthermore, waveform 72 represents the voltage appearing across diode D1 and resistor R9. Waveform 74 of FIG. 5C, appearing also in FIG. 5B, represents the additive combination of waveforms 70 and 72 of FIG. 5C, and this is the power supply to the silicon-controlled rectifier SCR-3, as appearing across line A-A' of FIG. 5A.

Accordingly, silicon-controlled rectifier SCR-3, gate-controlled by waveform 68 and supplied with a power supply voltage having waveform 74, produces a trigger voltage across resistors R11 and R12, this trigger voltage being represented by waveform 76 of FIG.

5B. Moreover, this trigger voltage is provided to SCR 42 of FIG. 1 as a control voltage thereto.

It is to be understood that the operation of opto-isolator I3, in conjunction with silicon-controlled rectifier SCR-4 and associated elements, in FIG. 5A, is identical to that described with respect to opto-isolator I2 and rectifier SCR-3, except that opto-isolator I3 and rectifier SCR-4 respond to the opposite phase of the voltage pulse waveform 68 of FIG. 5B. Thus, opto-isolator I3 and rectifier SCR-4 provide a trigger voltage for controlling SCR 43 of FIG. 1. It is also to be understood that phase B trigger circuitry 40b and phase C trigger circuitry 40c operate in a manner identical to phase A trigger circuitry 40a, so as to provide trigger voltages for controlling the operation of SCR's 44-47 of FIG. 1.

Figure 6B:
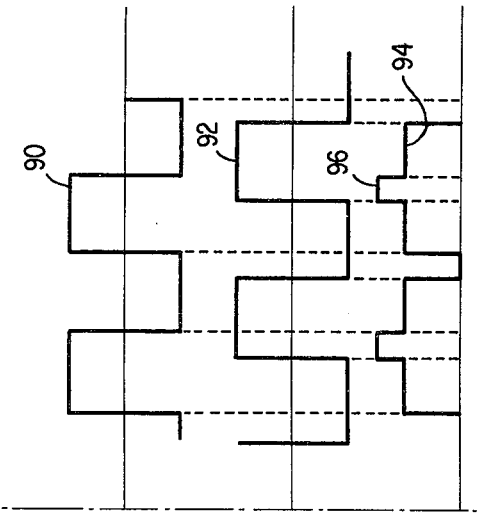
FIG. 6B is a waveform diagram related to the operation of the voltage reference circuit and current sensing circuit of FIG. 6A.
Figure 6A:
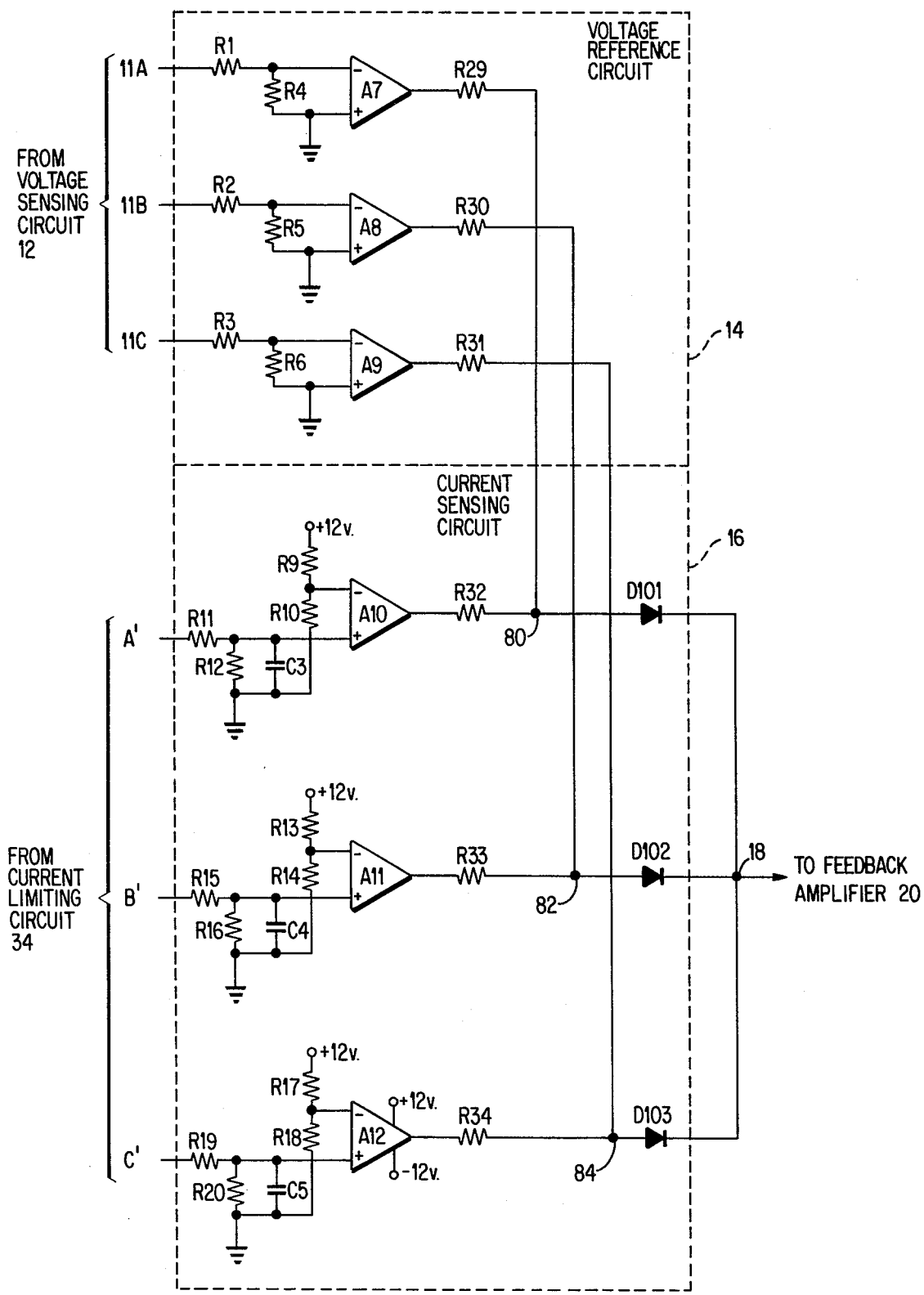
FIG. 6A is a schematic of the voltage reference circuit and current sensing circuit of the motor controller of the present invention.

FIG. 6A is a schematic of the voltage reference circuit 14 and current sensing circuit 16 of the motor controller of the present invention.

As seen therein, voltage reference circuit 14 basically comprises amplifiers A7, A8 and A9. Referring to FIGS. 6A and 6B, in operation, the aforementioned phase voltages 11A–11C, developed in voltage sensing circuit 12 (FIG. 5A), are provided through voltage-dividing resistors R1-R4, R2-5 and R3-R6, respectively, to the positive and negative inputs of corresponding amplifiers A7, A8 and A9. The outputs of amplifiers A7, A8 and A9 (represented by waveform 90 of FIG. 6B) are provided, via corresponding resistors R29, R30 and R31, to summing junctions 80, 82 and 84, respectively.

Current sensing circuit 16 basically comprises amplifiers A10, A11 and A12. In operation, the phase voltage outputs of switching circuitry 48 (FIG. 1) are provided, via voltage-dividing and filtering networks R11-R12-C3, R15-R16-C4, and R19-R20-C5, respectively, to the positive inputs of amplifiers A10, A11 and A12, respectively. The negative inputs of amplifiers A10–A12 are provided with reference voltages derived from voltage-dividing resistors R9-R10, R13-R14, and R17-R18, respectively. The resulting outputs of amplifiers A10, A11 and A12 (represented by waveform 92 of FIG. 6B) are provided, via resistors R32, R33 and R34, respectively, to corresponding junctions 80, 82 and 84. At these junctions, the outputs of amplifiers A10, A11 and A12 are summed with the outputs of amplifiers A7, A8 and A9 of voltage reference circuit 14 and provided, through diodes D101, D102 and D103, respectively, to develop summation outputs for each phase, represented by waveform 94 of FIG. 6B. Each waveform 94 has a superimposed voltage "cap" 96 representing the phase difference between motor voltage and motor current. The corresponding summed outputs for each phase are further summed at summing junction 18, and the resulting overall summed output is provided to feedback amplifier stage 20 (FIGS. 1 and 7).

As can be seen in FIG. 6A, each motor phase is provided with a respective current sensing input 11A, 11B or 11C and a respective voltage sensing input A', B' or C'. With such an arrangement, i.e., where both voltage and current are sensed on each phase of line power, the sensing circuits 14 and 16 of the motor controller yield six samples of phase comparisons per cycle of line power (each of the three phases yielding a sample during the positive half-cycle of the sine-wave and another sample during the negative half-cycle of the sine-wave). Thus, in a sixty-cycle per second line distribution system of the type disclosed herein, a phase comparison is made every 1/360th of a second; for purposes of comparison, a phase comparison would be made approximately every 1/120th of a second if sampled only twice per cycle of line power. The detected phase difference in each of the power mains A, B and C (inputs to sensors 14 and 16 of FIG. 6A) manifests itself at node 18 in the nature of a feedback control signal. For example, a phase difference in line A manifests itself at node 80, having a reference signal produced by combining the outputs of amplifiers A7 and A10 on line A. Likewise, the phase differences on lines B and C manifest themselves at nodes 82 and 84, respectively. Each of the reference signals at nodes 80, 82 and 84 then are summed at node 18 by way of diodes D101, D102 and D103. Therefore, it is seen that the feedback control signal at node 18 also effects power changes in the motor six times per cycle of line power.

As a result, any change in motor loading is sensed in one-sixth of a cycle with the present motor connection. This is important when one considers the relationship between speed of sensing and the minimum no-load voltage (and hence energy consumption) that can be tolerated by a motor without stalling, in response to the application of a rapidly-increasing load. Rapid sensing of load changes enables the use of a lower no-load voltage without any increase in the risk of stalling upon application of load.

Figure 7:
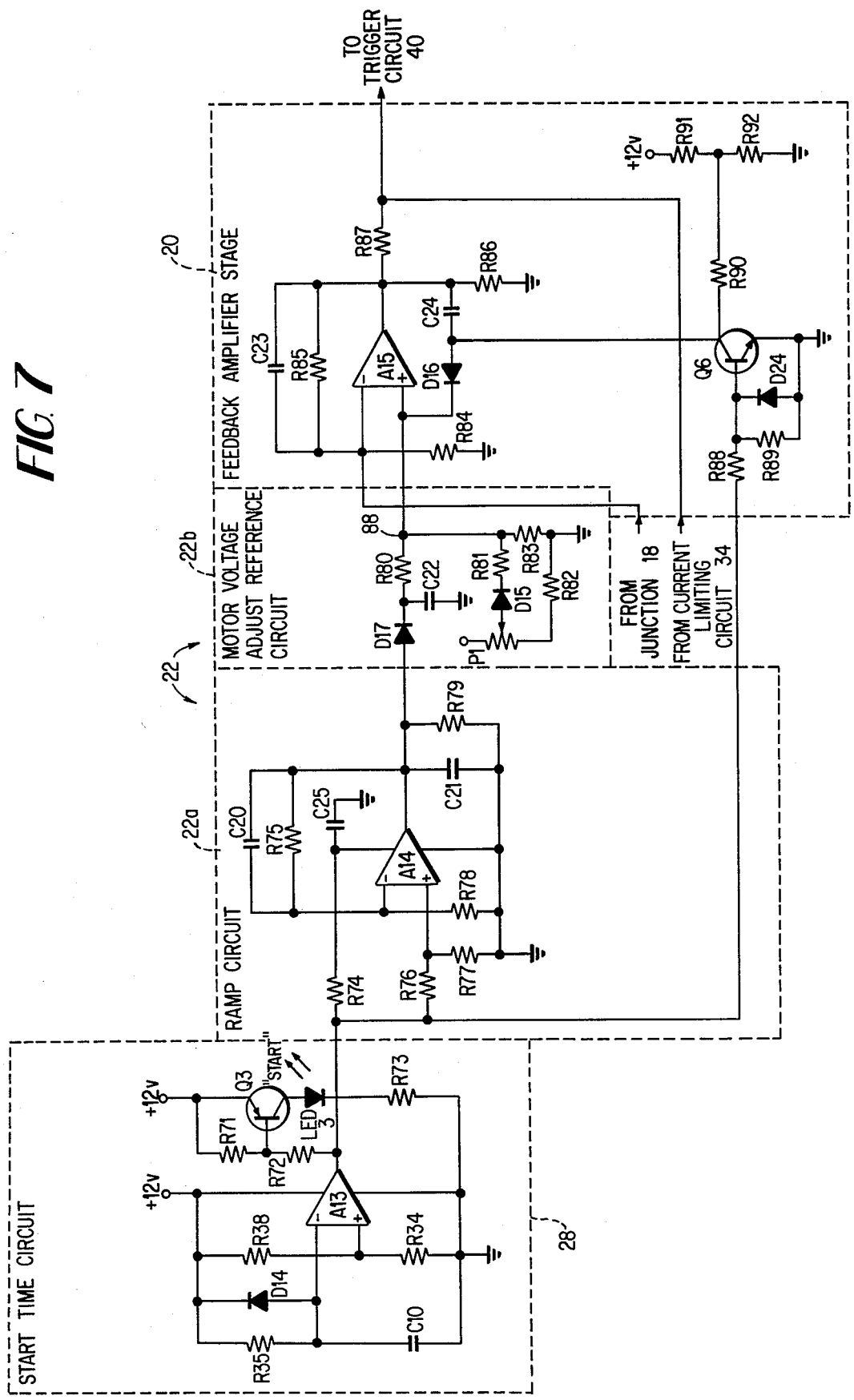
FIG. 7 is a schematic of the start time, ramp, motor voltage output reference and feedback amplifier circuits of the motor controller of the present invention.

FIG. 7 is a schematic of the start time circuit 28, the motor voltage adjust reference and ramp circuit 22, and the feedback amplifier stage 20 of the motor controller of the present invention.

As seen therein, start time circuit 28 basically comprises amplifier A13, transistor Q3, and light-emitting diode LED3. In operation, "start up" of the motor controller is detected by amplifier A13, in conjunction with resistors R34, R35 and R38, capacitor C10, and diode D14. As a result of this detection, amplifier A13 produces an output, applied via resistor R72, to the base of transistor Q3, turning that transistor on. The conduction of transistor Q3 drives light-emitting diode LED3, causing generation of an optical output 54 indicating that the motor controller is in the "start up" mode. The optical output 54 of diode LED3 is, as previously discussed above, provided to the opto-isolator I1 in current trip circuit 36 (FIG. 4). As a result, the "timed trip" function of current trip circuit 36 is disabled during "start up" of the motor controller.

Further referring to FIG. 7, ramp circuit 22a (contained within motor voltage adjust reference and ramp circuit 22 of FIG. 1) basically comprises amplifier A14, having its positive input connected, via voltage-dividing resistors R76 and R77, to the output of amplifier A13 of start time circuit 28. Moreover, amplifier A14 is provided with a control input, via resistor R74, from the output of amplifier A13, the control input of amplifier A14 being connected to ground via capacitor C25. The negative input of amplifier A14 is connected to its output in a feedback arrangement, the latter arrangement comprising capacitor C20 and resistor R75. In operation, amplifier A14, in response to the "start" output signal of amplifier A13, produces a ramp-type output voltage, this voltage growing in accordance with the time constant determined by the values of resistor R75 and capacitor C20. Filtering of this output is provided by resistor R79 and capacitor C21, connected between the output of amplifier A14 and ground.

Motor voltage adjust reference circuit 22b (contained within motor voltage adjust reference and ramp circuit 22 of FIG. 1) basically comprises diode D17, potentiometer P1 and associated diode D15, and associated resistors R80–R83. In operation, the ramp-type output of amplifier A14 of ramp circuit 22a is rectified in diode D17 and provided, via resistor R80, to summing junction 88. Summing junction 88 also receives, via diode D15 and resistors R81–R83, a reference voltage corresponding to the setting of potentiometer P1. Setting of potentiometer P1 corresponds to the previously discussed setting, by the operator, of potentiometer 22a (FIG. 1), so as to designate a motor voltage adjust reference. The designated motor voltage adjust reference is summed, at junction 88, with the rectified ramp-type output of ramp circuit 22a, and is then provided to feedback amplifier 20. This output provided to feedback amplifier 20 comprises the fixed reference, with which the phase angle difference between motor voltage and motor current (provided by junction 18 of FIG. 1) is compared in feedback amplifier stage 20.

Further referring to FIG. 7, feedback amplifier stage 20 basically comprises amplifier A15, associated resistors R84–R87, associated capacitors C23–C24, and diode D16, as well as transistor Q6, associated resistors R88–R92, and associated diode D24. In operation, amplifier A15 receives, at its negative input, a signal from junction 18 (located between the voltage reference 14 and current sensing circuit 16 of FIG. 1), the signal representing the phase difference between motor voltage and motor current. Amplifier A15 receives, at its positive input, the reference voltage provided by motor voltage adjust reference circuit 22b. Amplifier A15 compares the phase difference between motor voltage and motor current with the fixed reference, and provides a feedback output signal representing the results of this comparison, the feedback output signal being provided, via resistor R87, to trigger circuit 40. Thus, if the motor 50 (FIG. 1) is "loaded", the input to the negative input of amplifier A15 (from junction 18) will drop, resulting in a larger output from amplifier A15 to trigger circuitry 40. This results in increased conduction by the SCR's 40–47, as controlled by trigger circuitry 40, and the motor voltage will rise accordingly. The converse is also true.

It is to be noted that a fixed voltage, derived at the junction between resistors R91 (connected to a 12 volt supply) and R92, is provided, via resistor R90 and diode D16, to the positive input of amplifier A15. As a result of such arrangement, diode D16 is partially biased on. If a load is applied to the motor 50 (FIG. 1), this is sensed by the amplifier A15 in feedback amplifier stage 20, and the output of amplifier A15 increases, causing trigger circuitry 40 (FIG. 1) to controllably increase the conduction of the SCR's 42–47 in switching circuitry 48. Capacitor C24, connected to the output of amplifier A15, senses this increase in the output of amplifier A15, and fully biases diode D16, causing a further increase in the voltage applied to the positive input of amplifier A15. As a result, amplifier A15 even further increases its output to trigger circuitry 40, and the SCR's 42–47 in switching circuitry 48 are caused to conduct even further. Thus, it is seen that, when the load applied to already-loaded motor 50 is increased, a relatively quick buildup of more than sufficient power to the motor is achieved, thus precluding, or at least decreasing the chances of, a "stall" of the motor.

Returning to FIG. 7, resistor R83 forms, with capacitor C24 and diode D16, part of a voltage-divider at the positive input of amplifier A15. Under the influence of the increasing output of amplifier A15, capacitor C24 finally becomes fully charged, and stops passing positive feedback to the input of amplifier A15. As a result, the output of amplifier A15 returns to "normal", that is, returns to a level corresponding to the load on the motor. Thus, whereas an increased load on the motor results in the application of an "exaggerated" control output to the trigger circuitry 40 (so as to provide additional power to the motor, thus preventing or decreasing chances of stalling), after a short period of time, the control output from feedback amplifier stage 20 to trigger circuitry 40 comes back to a "normal" range, and, thus, a sustaining power is provided to the loaded motor.

Finally, on "start up" of the motor controller, an exception is made, in that the previously described capability is disabled. That is to say, on "start up", as indicated by an output from the amplifier A13 in start time circuit 28 (FIG. 7), transistor Q6 (the base of which is connected via grounding diode D24 and voltage-dividing resistors R88 and R89 to the output of amplifier A13) is turned on, and this results in grounding of capacitor C24 and diode D16, the latter being connected to the collector of transistor Q6, the emitter of which is connected to ground. As a result of the grounding of capacitor C24 and diode D16, amplifier A15 in feedback amplifier stage 20 does not provide an "exaggerated" output to the trigger circuitry 40. Thus, during "start up" of the motor controller, the motor 50 (FIG. 1) is loaded by a power input corresponding to the "start up" load, with the anti-stall feature (previously discussed) being disabled during "start up".

To summarize, in accordance with the present invention, an energy saving multi-phase motor controller is provided for controlling the voltage and power expended by a motor connected to a load. The disclosed embodiment of the motor controller discussed above is for use in controlling the voltage and power expended by a three-phase AC induction motor, such control being achieved by the provision of six SCR's 42–47 (FIG. 1), two SCR's being provided for each leg of the three-phase line. However, the invention of this application is not to be construed as being limited to a motor controller for a three-phase motor; it extends to multi-phase motor controllers in general.

A primary advantage of the motor controller of the present invention resides in the fact that, whereas prior art motor controllers have been mostly related to control of single-phase motors, and whereas attempts have been made to adapt such motor controllers for three-phase operation by internal alteration of electrical connections inside the motor, the present invention renders internal alteration of the electrical connections of the motor unnecessary. That is to say, the energy saving motor controller of the present invention can achieve control of various multi-phase motors (including, but not limited to, the wye and delta wound three-phase AC motors) without modifying the motor windings. Thus, the motor controller of the present invention can be used with existing, conventional, off-the-shelf three-phase AC motors.

As explained in detail above, control of the motor is accomplished by sensing the power factor angle, feeding it back, and comparing it with a reference voltage (which is the desired phase angle difference between motor voltage and current). The error signal derived at the output of the feedback amplifier stage is then amplified and used to provide the DC signal input to the six SCR's 42–47 in switching circuitry 48 of control stage 38 (FIG. 1).

The motor controller of the present invention provides other important functions. As described in detail above, it provides for application of additional ("exaggerated") power to the motor during increased loading of the already-loaded motor to prevent stalling, while, at the same time, acting as a reduced-voltage AC motor starter, reducing the "in rush" current during "start up", thus cutting down on peak power demand encountered by the user. The motor controller of the present invention also provides for operator-adjustable current limiting via the generation of an output CUTBACK by current limiting circuit 34 (FIG. 1). Moreover, phase-loss protection is provided by the inventive motor controller, the latter disabling operation of the subject controller once a phase loss is detected by phase loss circuit 26 (FIG. 1).

The motor controller of the present invention also provides a dual capability with respect to "tripping" the motor in periods of overload current. That is to say, in accordance with a first mode of operation, an instantaneous overload current trip output is provided upon detection of an overload in excess of a predetermined value. In this mode of operation, the controller "trips" the motor in eight milliseconds, corresponding to one-half of a line cycle, thus protecting the motor from overload current damage, as might result from a ground fault in the motor itself. In accordance with a second mode of operation, all three line currents of the three-phase line are sensed, and the current trip circuit 36 (FIG. 1) acts, in accordance with an inverse time function, to "trip" the motor when motor current exceeds a predetermined threshold set by the operator via switch 36a of the current trip circuit 36 (FIG. 1). That is to say, upon detection of overload, the motor is "tripped" more quickly for larger overloads, and more slowly for smaller overloads.

As mentioned above, the control stage 38, including trigger circuitry 40, of the motor controller of the present invention controls the switching circuitry 40, including the SCR's 42–47 thereof, in such a manner as to cause the SCR's 42–47 to act like fuses. Thus, the foremost deficiency of prior art controllers is avoided, in that the motor controller of the present invention does not need to employ fuses. This results in significant savings in cost of the controller.

Also, by sensing the phase difference between voltage and current on each power line separately, and by summing the phase difference representations, a much quicker response time is provided by the motor controller. Accordingly, the motor controller immediately may adjust the power required by the motor under rapidly changing load conditions and permits motor idling at lower non-loaded voltages without increase in risk of stall upon abrupt loading, thus saving even greater energy.

Figure 8:
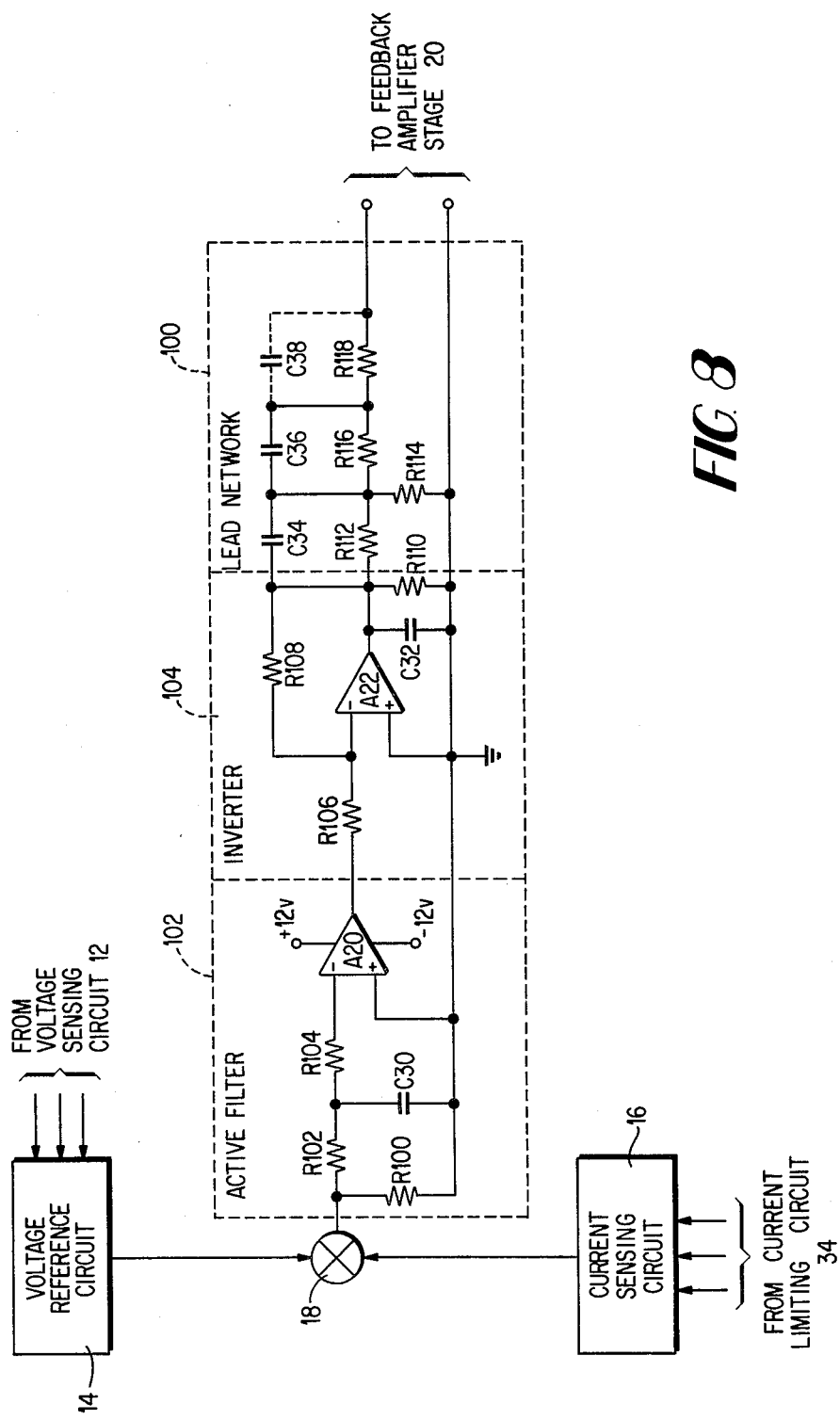
FIG. 8 is a block diagram of a portion of a further embodiment of the motor controller of the present invention.

FIG. 8 is a block diagram of a portion of a further embodiment of the motor controller of the present invention. Specifically, FIG. 8 depicts the voltage reference circuit 14, current sensing circuit 16, junction 18 and feedback amplifier stage 20, as previously shown in, and described with respect to, FIG. 1. As indicated in FIG. 8, a further embodiment of the motor controller of the present invention includes a lead network 100 inserted between the junction 18 and the feedback amplifier stage 20 for the purpose of providing enhanced stability of operation of the closed-loop system which controls power factor in the motor controller of the present invention.

More specifically, when the motor controller of the present invention is used to control a large three-phase motor, there is a lag in the system due to the long time constant of the motor. As this lag approaches 180°, the system could become unstable and go into an oscillatory state. In order to preclude this instability of operation, lead network 100 is inserted between the junction 18 and a feedback amplifier stage 20 so as to provide a leading phase angle to compensate for the lagging phase angle produced by the motor 50 (FIG. 1) and the other energy storage components, such as the integrating capacitor C23 in feedback amplifier stage 20 (FIG. 7).

Referring to FIG. 8, lead network 100 comprises a first lead stage made up of capacitor C34, resistor R112 and resistor R114. If this first lead stage does not produce adequate lead, additional stages (such as the second stage made up of capacitor C36 and resistor R116, and the third stage made up of capacitor C38 and resistor R118) can be added in a cascade-connected fashion.

As also seen in FIG. 8, a preferred embodiment includes an active filter 102 and an inverter 104 connected in series between the junction 18 and the lead network 100. Active filter 102 comprises resistors R100, R102 and R104, capacitor C30, and amplifier A20. Inverter 104 includes resistors R106, R108 and R110, capacitor C32, and amplifier A22. Active filter 102 and inverter 104 provide filtering and inversion, respectively, of the voltage from junction 18, prior to provision to lead network 100, so that a proper voltage and polarity is provided at the input of the lead network 100.

It is obvious that the embodiments of the present invention described hereinabove are merely illustrative, and that other modifications and adaptations thereto may be made without departing from the scope of the appended claims.

What is claimed is:

1. A multi-phase motor controller for controlling voltage and power expended by a multi-phase motor producing motor voltage and motor current, said controller adapted for external connection with said motor and comprising:

a plurality of sensing means, one for each phase of said multi-phase motor controller, for detecting respective phase angle differences between said motor voltage and said motor current for each phase individually;

summation circuit means for developing a summation of the phase angle differences;

a feedback amplifier connected to said summation circuit means for comparing the summation of said phase angle differences with a desired phase angle difference so as to generate a feedback control signal; and control means connected to each said sensing means and to said feedback amplifier, and responsive to said feedback control signal for controlling the voltage and power expended by said multi-phase motor in accordance therewith;

whereby said multi-phase motor controller controls the voltage and power expended by any said multi-phase motor, regardless of type, without internal modification or connection to the multi-phase motor.

2. The controller of claim 1, wherein said multi-phase motor is provided with an in-rush current during start-up thereof, said controller further comprising:

current limiting means connected between said multi-phase motor and said control means for detecting said start-up of said multi-phase motor, and responsive thereto for modifying said feedback control signal provided by said feedback amplifier to said control means so as to limit said in-rush current provided to said multi-phase motor during start-up.

3. The controller of claim 1, further comprising: current trip means connected between said multi-phase motor and said control means for detecting an overload current applied to said multi-phase motor, and responsive thereto for generating a trip signal, said trip signal being provided to said control means, said control means being responsive thereto for interrupting said voltage and power expended by said multi-phase motor.

4. The controller of claim 3, wherein said trip signal comprises a timed trip signal, said current trip means causing said control means to interrupt said voltage and power, expended by said multi-phase motor, over a period of time inversely proportional to the size of said overload current;
said controller further comprising disabling means for detecting start-up of said multi-phase motor, and responsive thereto for automatically disabling the operation of said current trip means during start-up of said multi-phase motor.

5. The controller of claim 3, wherein said trip signal comprises a timed trip signal, said current trip means causing said control means to interrupt said voltage and power, expended by said multi-phase motor, over a period of time inversely proportional to the size of said overload current;
said controller further comprising phase loss detection means for detecting loss of phase, and responsive thereto for providing a disabling output to said control means, said control means being responsive to said disabling output for automatically eliminating said voltage and power expended by said multi-phase motor during said phase loss.

6. In a multi-phase motor controller for controlling voltage and power expended by a multi-phase motor producing motor voltage and motor current, a control circuit for controlling the voltage and power expended by said multi-phase motor, said control circuit comprising:
a plurality of sensing means, one for each phase of said multi-phase controller, for detecting a phase angle difference between said motor voltage and said motor current for each phase individually;
a plurality of pairs of silicon-controlled rectifiers, one pair for each phase of said multi-phase motor; and
trigger means, one for each phase of said multi-phase motor, connected to each said sensing means, and responsive to said detected phase angle difference as detected by said plurality of sensing means for providing corresponding properly timed gate pulses to corresponding ones of said plurality of pairs of silicon-controlled rectifiers, respectively;
whereby said multi-phase motor controller controls the voltage and power expended by any said multi-phase motor, regardless of type, without internal modification or connection to the multi-phase motor.

7. In the controller of claim 6, wherein said multi-phase motor is provided with an in-rush current during start-up thereof, further comprising current limiting means connected between said multi-phase motor and said control circuit for detecting said start-up of said multi-phase motor, and responsive thereto for limiting said in-rush current provided to said multi-phase motor during start-up.

8. In the controller of claim 9, further comprising current trip means connected between said multi-phase motor and said control circuit for detecting an overload current applied to said multi-phase motor, and responsive thereto for generating a trip signal, said trip signal being provided to said control circuit, said control circuit being responsive thereto for interrupting said voltage and power expended by said multi-phase motor.

9. In the controller of claim 8, wherein said trip signal comprises a timed trip signal, said current trip means causing said control circuit to interrupt said voltage and power, expended by said multi-phase motor, over a period of time inversely proportional to the size of said overload current;
said controller further comprising disabling means for detecting start-up of said multi-phase motor, and responsive thereto for automatically disabling the operation of said current trip means during start-up of said multi-phase motor.

10. In the controller of claim 8, wherein said trip signal comprises a timed trip signal, said current trip means causing said control circuit to interrupt said voltage and power, expended by said multi-phase motor, over a period of time inversely proportional to the size of said overload current;
said controller further comprising phase loss detection means for detecting loss of phase, and responsive thereto for providing a disabling output to said control circuit, said control circuit being responsive to said disabling output for automatically eliminating said voltage and power expended by said multi-phase motor during said phase loss.

11. A multi-phase motor controller for controlling voltage and power expended by a multi-phase motor producing motor voltage and motor current, said controller adapted for external connection with said motor and comprising:
a plurality of sensing means, one for each phase of said multi-phase motor controller, for detecting respective phase angle differences between said motor voltage and said motor current for each phase individually;
summation circuit means for developing a summation of the phase angle differences;
a feedback amplifier connected to said summation circuit means for comparing the summation of said phase angle differences with a desired phase angle difference so as to generate a feedback control signal; and
control means connected to said feedback amplifier, and responsive to said feedback control signal for controlling the voltage and power expended by said multi-phase motor in accordance therewith;
said controller further comprising stabilizing means connected between said sensing means and said feedback amplifier, and responsive to a lagging phase angle produced by said mutli-phase motor for providing a leading phase angle to compensate therefor;
whereby said multi-phase motor controller controls the voltage and power expended by any said multi-phase motor, regardless of type, without internal modification or connection to the multi-phase motor.

12. The controller of claim 11, wherein said stabilizing means comprises at least one lead network.

13. The controller of claim 12, wherein said stabilizing means further comprises an inverter circuit connected between said sensing means and said at least one lead network.

14. The controller of claim 12, wherein said stabilizing means further comprises a filter circuit connected between said sensing means and said at least one lead network.

* * * * *